(12) United States Patent
Ahern et al.

(10) Patent No.: US 7,221,389 B2
(45) Date of Patent: May 22, 2007

(54) AUTOMATIC EQUALIZATION OF VIDEO SIGNALS

(75) Inventors: Stephen M Ahern, Sixmilebridge (IE); Aengus Gorey, Limerick (IE)

(73) Assignee: Avocent Corporation, Huntsville, AL (US)

( * ) Notice: Subject to any disclaimer, the term of this patent is extended or adjusted under 35 U.S.C. 154(b) by 632 days.

(21) Appl. No.: 10/366,695

(22) Filed: Feb. 14, 2003

(65) Prior Publication Data

US 2003/0218578 A1 Nov. 27, 2003

Related U.S. Application Data

(60) Provisional application No. 60/356,706, filed on Feb. 15, 2002.

(51) Int. Cl.
  *H04N 17/00* (2006.01)
  *H04B 3/46* (2006.01)
  *G01R 29/26* (2006.01)
  *G06F 15/173* (2006.01)

(52) U.S. Cl. .................... 348/192; 375/224; 702/69; 709/224

(58) Field of Classification Search ................ 348/181, 348/192; 725/98, 74, 72, 118, 124, 125; 345/2.1; 709/220, 249, 250, 224; 439/676; 370/296, 401, 410, 450; 375/229, 350, 224, 375/257; 324/675, 681; 702/122, 58, 69, 702/76

See application file for complete search history.

(56) References Cited

U.S. PATENT DOCUMENTS 5,251,018 A 10/1993 Jang et al.

(Continued)

OTHER PUBLICATIONS

International Search Report relating to PCT/US03/04707 dated Jul. 11, 2003.
International Preliminary Examination Report in corresponding PCT application PCT/US2003/04707, mailed Oct. 1, 2004.
PCT Written Opinion in corresponding PCT application PCT/US2003/04707, mailed Mar. 4, 2004.
Malaysian Search Report in corresponding Malaysian application PI20030608, mailed Mar. 6, 2007, Malaysian filing date Feb. 14, 2003.

*Primary Examiner*—Victor R. Kostak

(74) *Attorney, Agent, or Firm*—Davidson Berquist Jackson & Gowdey LLP

(57) ABSTRACT

A video compensation system for analog video transmission is described. The compensation system is employed in an analog video switching circuit such that each time a conductive path is switched, the system automatically tests the new switch path for a new compensation value. The compensation value is determined by measuring the response of the new path to a set of tones that are applied to the conductive path, the response to which is measured against a table of responses previously recorded. The measured responses are compared to the recorded responses to determine an appropriate compensation control voltage, which is applied to an equalizer system. In an alternative embodiment, the skew compensations also provided between red, green, and blue twisted pair lines in the cables by performing comparative analysis between corresponding pairs of the red, green, and blue signals.

12 Claims, 8 Drawing Sheets

U.S. PATENT DOCUMENTS

| | | | |
|---|---|---|---|
| 5,731,706 A * | 3/1998 | Koeman et al. | 324/628 |
| 5,844,940 A * | 12/1998 | Goodson et al. | 375/222 |
| 5,870,429 A * | 2/1999 | Moran et al. | 375/222 |
| 5,967,853 A | 10/1999 | Hashim | |
| 5,997,358 A | 12/1999 | Adriaenssens et al. | |
| 6,060,890 A * | 5/2000 | Tsinker | 324/676 |
| 6,194,889 B1 * | 2/2001 | Vokey | 324/67 |
| 6,240,554 B1 | 5/2001 | Fenouil | |
| 6,345,323 B1 | 2/2002 | Beasley et al. | |
| 6,370,191 B1 * | 4/2002 | Mahant-Shetti et al. | 375/233 |
| 6,434,374 B1 * | 8/2002 | Muterspaugh | 455/234.1 |
| 6,567,464 B2 * | 5/2003 | Hamdi | 375/222 |
| 6,571,393 B1 | 5/2003 | Ko et al. | |
| 6,590,930 B1 * | 7/2003 | Greiss | 375/224 |
| 6,972,786 B1 * | 12/2005 | Ludwig | 348/14.11 |
| 2001/0048667 A1 * | 12/2001 | Hamdi | 370/252 |

* cited by examiner

VCM Measured Data    Selected Bands ::= 18, 18, 18

Pre Equalisation Delays ::- 0x0014 0x0015

0x03B1,0x03B1,0x03B1,0x03B0,0x03B0,0x03B0,0x03B1, ⎫
0x03B1,0x03B1,0x03B1,0x03B1,0x03B1,0x03B1,0x03B1, ⎬ TONE 1 — RED
0x03B3,0x03B3,0x03B4,0x03B3,0x03B3,0x03B3,0x03B3, ⎭ — GREEN
0x0399,0x0398,0x0398,0x0399,0x0399,0x0398,0x0399, ⎫ — BLUE
0x039A,0x039A,0x039A,0x039A,0x039A,0x039A,0x039A, ⎬ TONE 2
0x039E,0x039E,0x039D,0x039E,0x039E,0x039E,0x039E, ⎭
0x0363,0x0363,0x0362,0x0362,0x0363,0x0362,0x0363, ⎫
0x0365,0x0366,0x0365,0x0365,0x0365,0x0365,0x0365, ⎬ TONE 3
0x036A,0x036A,0x036A,0x036A,0x036A,0x036A,0x036A, ⎭
0x0316,0x0316,0x0316,0x0316,0x0316,0x0317,0x0316, ⎫
0x0316,0x0316,0x0317,0x0317,0x0316,0x0317,0x0317, ⎬ TONE 4
0x031E,0x031D,0x031F,0x031E,0x031F,0x031E,0x031E, ⎭
0x02D6,0x02D6,0x02D6,0x02D6,0x02D6,0x02D6,0x02D6, ⎫
0x02DB,0x02DA,0x02DA,0x02DA,0x02DA,0x02DA,0x02DA, ⎬ TONE 5
0x02E2,0x02E2,0x02E2,0x02E1,0x02E2,0x02E2,0x02E2, ⎭
0x01EC,0x01F9,0x01ED,0x01FC,0x01EE,0x01FE,0x01EC, ⎫
0x01F7,0x01FA,0x01F5,0x01F8,0x01FA,0x01F7,0x01F7, ⎬ TONE 6
0x021A,0x021D,0x0210,0x021D,0x0215,0x021B,0x021D, ⎭

FIGURE 4

| | Resolution | 10 | | | | | | |
|---|---|---|---|---|---|---|---|---|
| | Referance | 2.5 | | | | | | |
| | 1 Bit Value | 0.002441 | | | | | | |

FIGURE 5

| | Distance | | | | | | | |
|---|---|---|---|---|---|---|---|---|
| Tones | 6 | | 50 | | 100 | | 150 | |
| 325K | 2.429 | 03E2 | 2.422 | 03E0 | 2.417 | 03DE | 2.41 | 03DB |
| 750K | 2.427 | 03E2 | 2.419 | 03DE | 2.412 | 03DB | 2.4 | 03D7 |
| 2MHz | 2.412 | 03DB | 2.397 | 03D5 | 2.385 | 03D0 | 2.366 | 03C9 |
| 6MHz | 2.375 | 03CC | 2.353 | 03C3 | 2.329 | 03B9 | 2.3 | 03AE |
| 12MHz | 2.336 | 03BC | 2.305 | 03B0 | 2.273 | 03A3 | 2.236 | 0393 |
| 48-MHz | 2.168 | 0378 | 2.107 | 035F | 2.05 | 0347 | 1.989 | 032E |

| | Distance | | | | | | | |
|---|---|---|---|---|---|---|---|---|
| Tones | 200 | | 250 | | 300 | | 350 | |
| 325K | 2.405 | 03D9 | 2.402 | 03D7 | 2.397 | 03D5 | 2.39 | 03D2 |
| 750K | 2.39 | 03D2 | 2.388 | 03D2 | 2.378 | 03CE | 2.368 | 03C9 |
| 2MHz | 2.351 | 03C2 | 2.344 | 03C0 | 2.326 | 03B8 | 2.309 | 03B1 |
| 6MHz | 2.275 | 03A3 | 2.261 | 039E | 2.234 | 0393 | 2.207 | 0387 |
| 12MHz | 2.204 | 0386 | 2.185 | 037E | 2.148 | 036F | 2.114 | 0361 |
| 48MHz | 1.94 | 031A | 1.908 | 030D | 1.857 | 02F8 | 1.804 | 02E2 |

| | Distance | | | | | | | |
|---|---|---|---|---|---|---|---|---|
| Tones | 400 | | 450 | | 500 | | 550 | |
| 325K | 2.383 | 03D0 | 2.375 | 03CC | 2.371 | 03CB | 2.366 | 03C9 |
| 750K | 2.353 | 03C3 | 2.346 | 03C0 | 2.339 | 03BE | 2.329 | 03B9 |
| 2MHz | 2.285 | 03A7 | 2.258 | 03A0 | 2.258 | 039C | 2.243 | 0396 |
| 6MHz | 2.165 | 0376 | 2.141 | 036C | 2.129 | 0368 | 2.102 | 035C |
| 12MHz | 2.063 | 034D | 2.031 | 033F | 2.019 | 033A | 1.989 | 032E |
| 48MHz | 1.716 | 02BE | 1.664 | 02A9 | 1.637 | 029E | 1.584 | 0288 |

| | Distance | | | | | | | |
|---|---|---|---|---|---|---|---|---|
| Tones | 600 | | 650 | | 700 | | 750 | |
| 325 K | 2.361 | 03C7 | 2.353 | 03C3 | 2.348 | 03C1 | 2.344 | 03C0 |
| 750K | 2.322 | 03B7 | 2.314 | 03B3 | 2.307 | 03B0 | 2.3 | 03AE |
| 2MHz | 2.229 | 0390 | 2.214 | 038A | 2.202 | 0385 | 2.192 | 0381 |
| 6MHz | 2.082 | 0354 | 2.06 | 034B | 2.041 | 0343 | 2.028 | 033E |
| 12MHz | 1.965 | 0324 | 1.935 | 0318 | 1.913 | 030F | 1.899 | 0309 |
| 48MHz | 1.535 | 0274 | 1.478 | 025D | 1.427 | 0248 | 1.398 | 023C |

| | Distance | | | | | | | |
|---|---|---|---|---|---|---|---|---|
| Tones | 800 | | 850 | | 900 | | 950 | |
| 325K | 2.339 | 03BE | 2.334 | 03BC | 2.326 | 03B8 | 2.322 | 03B7 |
| 750 K | 2.292 | 03AA | 2.283 | 03A7 | 2.275 | 03A3 | 2.268 | 03A0 |
| 2MHz | 2.177 | 037B | 2.165 | 0376 | 2.155 | 0372 | 2.141 | 036C |
| 6MHz | 2.003 | 0334 | 1.989 | 032E | 1.97 | 0325 | 1.957 | 0321 |
| 612MHz | 1.874 | 02FF | 1.852 | 02F6 | 1.828 | 02EC | 1.804 | 02E2 |
| 48MHz | 1.359 | 022C | 1.298 | 0213 | 1.281 | 020C | 1.273 | 0209 |

| | Distance | | | | | | | |
|---|---|---|---|---|---|---|---|---|
| Tones | 1000 | | 1050 | | 1100 | | 1150 | |
| 325 K | 2.312 | 03B2 | 0000 | | 0000 | | 0000 | |
| 750 K | 2.256 | 039C | 0000 | | 0000 | | 0000 | |
| 2MHz | 2.124 | 0365 | 0000 | | 0000 | | 0000 | |
| 6MHz | 1.931 | 0316 | 0000 | | 0000 | | 0000 | |
| 12MHz | 1.767 | 02D3 | 0000 | | 0000 | | 0000 | |
| 48MHz | 1.122 | 01CB | 0000 | | 0000 | | 0000 | |

| Resolution | 8 | 1 Bit Value | 0.009766 |
|---|---|---|---|
| Reference | 2.5 | | |

| | Distance | | | |
|---|---|---|---|---|
| | 6 | 50 | 100 | 150 |
| Eq Bands | | | | |
| DC | 2.05 D1 | 2.04 D0 | 2.03 CF | 2.02 CE |
| LOW | 0.5 33 | 0.7 47 | 0.88 5A | 0.88 5A |
| MID | 0.5 33 | 0.72 49 | 0.87 59 | 0.87 59 |
| HI - Volts | 0 00 | 0 00 | 0 00 | 0 00 |
| HI - Poles | 0 00 | 0 00 | 0 00 | 0 00 |

| | Distance | | | |
|---|---|---|---|---|
| | 200 | 250 | 300 | 350 |
| Eq Bands | | | | |
| DC | 2.02 CE | 2.02 CE | 2.01 CD | 2.01 CD |
| LOW | 0.92 5E | 0.93 5F | 0.94 60 | 0.96 62 |
| MID | 0.89 5B | 0.9 5C | 0.92 5E | 0.96 62 |
| HI - Volts | 0 00 | 0 00 | 0 00 | 0 00 |
| HI - Poles | 0 00 | 0 00 | 0 00 | 0 00 |

| | Distance | | | |
|---|---|---|---|---|
| | 400 | 450 | 500 | 550 |
| Eq Bands | | | | |
| DC | 2 CC | 2 CC | 2 CC | 1.98 CA |
| LOW | 0.98 64 | 0.98 64 | 0.98 64 | 1 66 |
| MID | 0.98 64 | 0.98 64 | 0.98 64 | 1.01 67 |
| HI - Volts | 0 00 | 0 00 | 0 00 | 0 00 |
| HI - Poles | 0 00 | 0 00 | 0 00 | 0 00 |

| | Distance | | | |
|---|---|---|---|---|
| | 600 | 650 | 700 | 750 |
| Eq Bands | | | | |
| DC | 1.98 CA | 1.98 CA | 1.975 CA | 1.97 C9 |
| LOW | 1 66 | 1.01 67 | 1.03 69 | 1.05 6B |
| MID | 1.01 67 | 1.02 68 | 1.04 6A | 1.06 6C |
| HI - Volts | 0 00 | 0 00 | 0 00 | 0 00 |
| HI - Poles | 0 00 | 0 00 | 0 00 | 0 00 |

| | Distance | | | |
|---|---|---|---|---|
| | 800 | 850 | 900 | 950 |
| Eq Bands | | | | |
| DC | 1.97 C9 | 1.96 C8 | 1.96 C8 | 1.94 C6 |
| LOW | 1.06 6C | 1.08 6E | 1.1 70 | 1.11 71 |
| MID | 1.08 6E | 1.1 70 | 1.12 72 | 1.15 75 |
| HI - Volts | 0 00 | 0 00 | 0 00 | 0 00 |
| HI - Poles | 0 00 | 0 00 | 0 00 | 0 00 |

| | Distance | | | |
|---|---|---|---|---|
| | 1000 | 1050 | 1100 | 1150 |
| Eq Bands | | | | |
| DC | 1.92 C4 | | | |
| LOW | 1.13 73 | | | |
| MID | 1.17 77 | | | |
| HI - Volts | 0 00 | | | |
| HI - Poles | 0 00 | | | |

FIGURE 6

AUTOMATIC EQUALIZATION OF VIDEO SIGNALS

CROSS-REFERENCES TO RELATED APPLICATIONS

This invention relates to analog video switching. This application claims the priority of U.S. Application No. 60/356,706, filed Feb. 15, 2002 the entire contents of which are incorporated herein by reference.

BACKGROUND AND SUMMARY OF THE INVENTION

The present invention has application within the environment of analog video extenders. In modern environments, one embodiment is incorporated into keyboard, video mouse (KVM) switches that connect multiple user workstations (such as keyboards, mice, monitors, etc.) with selected ones of multiple different servers. Analog KVM switches route video between the workstations and the servers in the analog domain and provide for high bandwidth real-time video and multimedia transmissions. One such analog KVM switch is the analog matrix switch (AMS) developed and sold by Avocent Corporation of Huntsville, Ala. An example analog switch architecture is shown in FIG. 1.

In FIG. 1, the system is made up of servers 10–15, computer interface pods (CIP) 16–21, analog matrix switches (AMS) 22–24, analog user pods (AUP) 31–35, and user workstations 36–40. Also shown in FIG. 1 are a hub 26 communicating with switch or router 27, communicating with corporate LAN 28, and communicating with a matrix system administrator (MSA) 29 operating on a computer 30. Also shown in FIG. 1 is a local computer 41 communicating with workstation 40 through CIP 41 and AUP 35.

The example in FIG. 1 is but one example embodiment of how the AMS system can be arranged into a distributed architecture, and many other architectures (both of simpler and more complex arrangement) will be understood to the artisan upon review of FIG. 1. Further, the example of FIG. 1 is described simply to give an example context into which the present invention may have application and in no way is intended to limit the broad aspects of the present invention.

The system in FIG. 1 provides command, control, and switching of KVM signals between servers 10–15 and workstations 36–40, as well as controlled by MSA application 29 of the system as a whole. The AMS system of FIG. 1 operates independently of software applications on the servers or workstations. In essence, the system is responsible for establishing connectivity paths between users at the workstations 36–40 and servers 10–15, switching and routing of KVM signals throughout the system, user authentication, and software upgrades at the unit end system level as directed by the MSA 29.

As background, the AMS 22–24 connects to servers 10–15 via CIPs 16–21. CIPs convert the native KVM connections to proprietary long distance signals and serves as the interface between an individual server and the KVM matrix system. The connections between CIP and the AMS units can be by industry standard UTPlus cabling, as are all other connections between the system elements.

On the workstation side, users are connected to the AMS 22–24 via AUPs 31–35. AUPs are a desktop design with a universal power supply and can provide peripheral support for a variety of different workstation types, such as PS/2, Sun, etc. As shown in FIG. 1, the AUP may be directly connected via UTPlus cable to one-to-four AMS or CIP modules. The AUPs can be in a mix and match configuration, such as AUP 34, which communicates with AMS 25 and CIP 21.

Because structure of the system employing the present invention is not a critical aspect of the present invention, the example of FIG. 1 is relevant only for its illustration of transmission of analog video signals between the component servers, CIPs, AMSs, AUPs, and the workstation.

In an example of FIG. 1, the AMS 22–25 connects to servers 10–15 via CIP 16–21 to convert KVM signals from native connectors and cabling to long line (long distance) communication protocols. The physical connection between the CIPs and the AMSs is via UTPlus cable. On the other end, the AMSs 22–24 connect to AUPs 31–35 also by UTPlus cable. The maximum distance between CIPs and AUPs is dictated by the degradation that occurs in the analog video signal over long distances. Distances between CIPs and AUPs of about 300 meters are difficult to obtain for high bandwidth, high quality video having present compensation schemes. The principle purpose of the AMS is to switch video (and data) between any of its inputs and outputs, thereby connecting selected workstations 36–40 with selected computers 10–15.

The analog user pod (AUP) is the main user console interface component of the AMS system. The AUP 31–35 provides KVM connectivity between the user console and either AMSs 22–25 or CIPs 16–21. Because a video degradation occurs in the cabling, the present invention relates to methods for correcting the video distortion caused by signal losses in the video transmission. In one example, such correction occurs in the AUP 31–35 and is carried out during each switch from a user to a server. The AUP also provides on-screen display menu-based technology to permit users to select new computers for connection via an on-screen menu. Each time the user employs the OSD menu to select a new computer, the video correction functions can be performed by the AUP to permit fully compensated video to be provided to the user shortly after the switch request is initiated.

On the other end, the computer interface pod (CIP) converts computer KVM signals into a format that can be transmitted down UTPlus cable to the AMS or AUP. All of the UTPlus cable described herein is usually four-pair unshielded, twisted pair cable that is rated category five or better. Other alternative cables are, of course, employable in a system that also employs the compensation systems of the present invention. Each CIP employs one KVM computer port, using native connectors for servers 10–15.

The matrix switch administrator (MSA) 29 is a client software on computer 30 that allows the administrator of the analog matrix system to easily configure, monitor and maintain the system from a remote computer 30 on an attached LAN 28 or connected via a cross-over cable. The MSA 29 allows the administrator to perform functions such as user settings, server settings, system monitoring, system administration, system logging, etc. The MSA 29 may also perform port status, event logging, trace routing, etc., via it's network port.

As previously described, in the system of FIG. 1, and other analog matrix switching systems, analog video is degraded as it travels along cables. The present invention compensates for video distortion on industry standard cabling (such as CAT5, CAT5e and CAT-6 (including gigaflex), and any other standard cabling) to provide high quality video up to 1,000 feet away from servers 10–15. The compensation is accomplished by three compensation features, used independently or in any combination. The first is automatic adaptive cable equalization in which the system automatically corrects for frequency dependent attenuation each time a valid KVM path is selected. The second is automatic adaptive cable de-skew compensation that automatically detects and corrects for inter-pair delay skew that is inherent in, for example, CAT5 style cables. The third is compensation obtained by reducing data link pair cross talk in CAT5 RJ45 connectors.

BRIEF DESCRIPTION OF THE DRAWINGS

FIG. 4 is an example data chart of laboratory measurements of a cable in accordance with an example embodiment of the present invention;

FIG. 5 is an example measurement map of a cable in an example embodiment of the present invention;

FIG. 6 is an example equalization control voltage chart in accordance with an example embodiment of the present invention;

DETAILED DESCRIPTION OF THE PRESENTLY PREFERRED EMBODIMENTS

Figure 1:
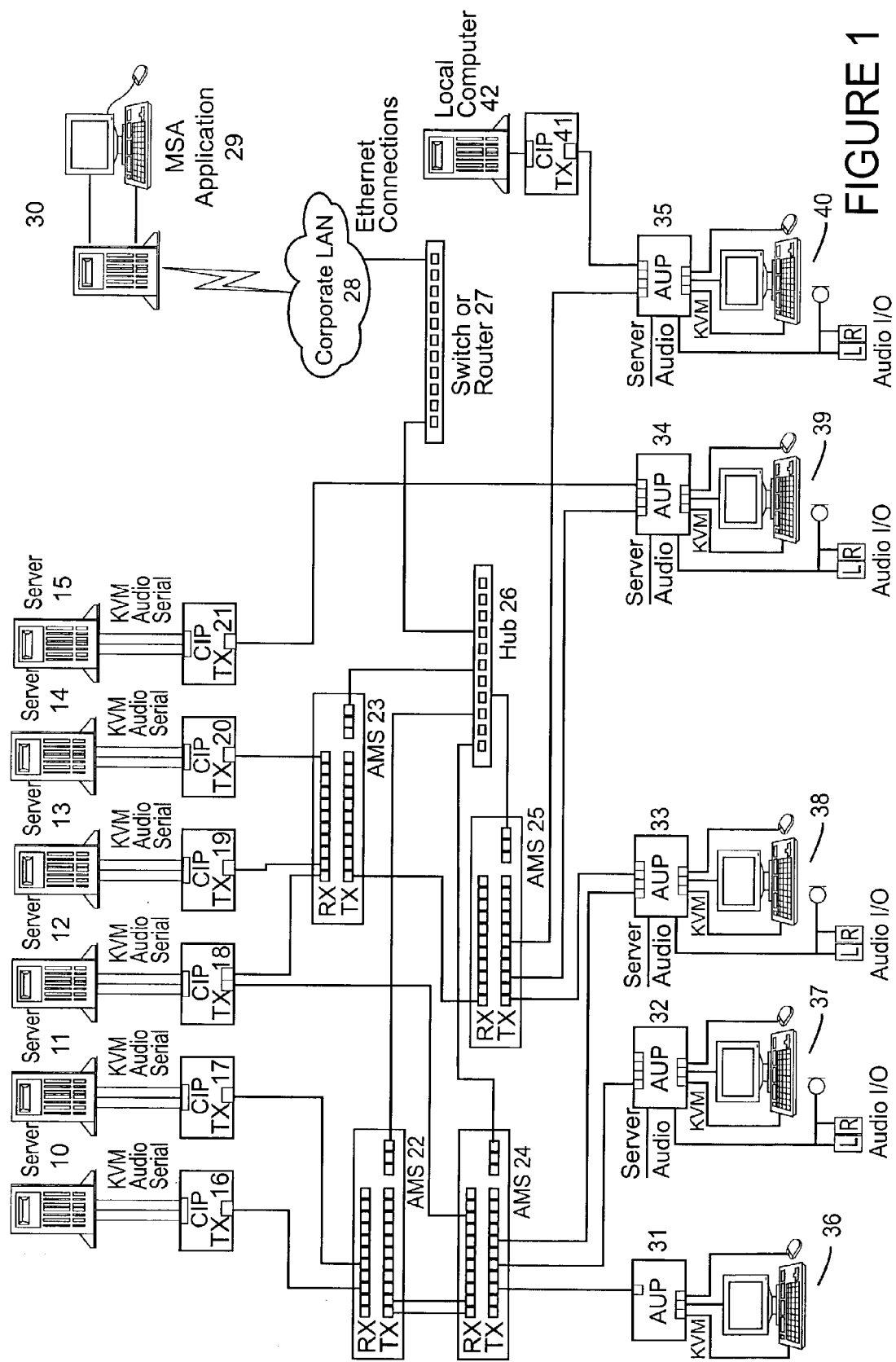
FIG. 1 is a schematic representation of an example matrix switching system into which the present invention may have application.

In the preferred embodiment of the present invention, the matrix switching system performs video compensation on-the-fly as switching occurs between the workstations 31–35 and the servers 10–15. That is, as each new connection occurs between a workstation and a server, a new path of, for example, CAT5 cable is employed that may have its own unique video degradation characteristics for which compensation is desired. A single compensation system for a workstation and for a server may not successfully compensate when the workstation is communicating with a different server, or vice a versa. In accordance with the preferred embodiment, each time a switching operation occurs, new video compensation is applied to the video signal in order to compensate for the unique characteristics of the new connectivity path.

Automatic Adaptive Cable Equalization.

Equalization is the compensation for normal frequency dependent error related to the skin effect on cables. To equalize, one must apply an opposite frequency response curve to boost video signals received from the cables at the reception end. A problem occurs in determining how much frequency response to apply, and in ensuring that the frequency response compensation is done transparently to the user. The prior art provided amplitude compensation with frequency dependent gain stages, with the amplitude set for an arbitrary length of cable. The preferred embodiment provides equalization that is independent of cable type and cable length, such that the equalization can be adapted for various cable types and lengths.

In the preferred embodiment, a cable is swept with a set of tones and the response to the tones recorded. In a preferred example, six tones are employed, although other numbers can be employed for greater or less sensitivity. Prior to implementation, the amplitude of each tone over the cable (for various cable lengths) is measured and a coefficient giving the frequency response of the cable on each length is determined. After implementation, software routines at the end of the cable receiving the video components generate control voltages in accordance with the coefficients determined. Importantly, all of this can be done in about a tenth of a second, using CAT5 cable.

For implementation of the software, preferably in a laboratory, a list of coefficients for ten foot segments (or more or less, depending on sensitivity desired) up to 1,000 feet for the various tones is created and stored into a memory table. Examples of those coefficients are shown in the Appendix of U.S. Application No. 60/356,706, which is incorporated by reference and, for brevity will not be repeated herein. For illustration purposes, one of such charts is shown in FIG. 4, for an example 90 ft. cable length.

Presently, CAT5 cables are traditionally used for the transmission of video signals, which cable is 24 AWG and therefore the skin effect (which is based primarily on the diameter of a wire) is substantially the same for all CAT5 transmission systems. Thus, the coefficients recorded in the laboratory for CAT5 cable should accurately represent CAT5 cables, provided the 24 AWG dimension is being maintained. If other dimensions are desired, of course other laboratory measurements can be employed to create different tables, which can be used instead of, or in addition to, 24 AWG cable tables.

The table of ten foot interval coefficients are recorded into the AUP 31–35 of a KVM switch system. Next, a second table (FIG. 5) is prepared (again in a lab) which identifies, for fifty foot cable increments, control voltages versus distance needed to correct video signals on the cable. That example chart of FIG. 5 is shown at the indicated fifty foot increments. The incremental values are not critical—they can be more or less than 50 feet for different sensitivities.

In practice, the computer interface pod (IP 16–21) sends the tones (preferably the six tones) down each of the color component CAT5 cables and the frequency and amplitude of the tones are measured at the AUP 31–35. These measured coefficients are compared to the ten foot coefficient versus distance table (FIG. 4, in part) to determine a best fit, which identifies a "distance" identifier (even though the distance may not necessarily exactly equate with the true distance of the cable). The distance is then compared to the fifty foot control voltages versus distance table to determine an appropriate control voltage for the "distance" provided by the first map. The result is a control voltage that can be applied to the CAT5 component cable to provide frequency compensation.

Figure 2:
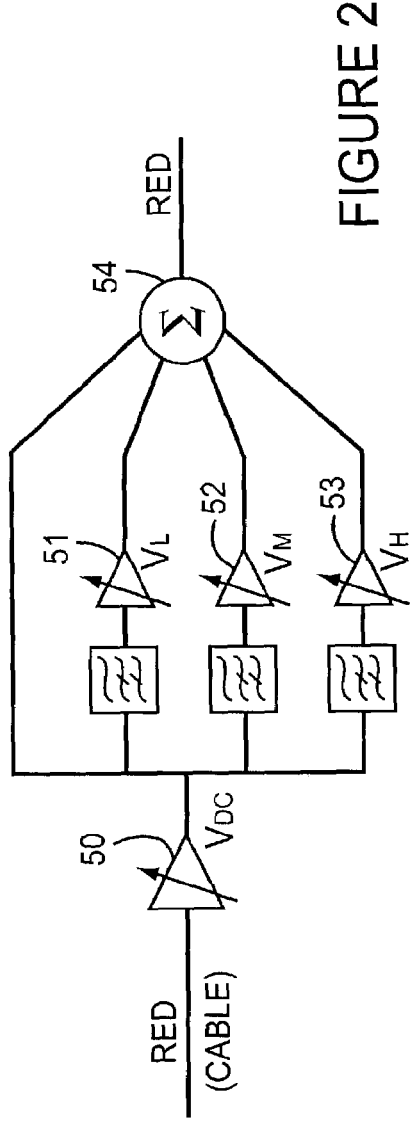
FIG. 2 is a schematic diagram of example video equalization circuits.

The control voltages are applied to DC($V_{DC}$), LO($V_L$), MD($V_m$), and HI($V_H$) stage amplifiers acting on the color components as shown in FIG. 2. An example of the control voltages for an example cable is shown in FIG. 6.

The preferred apparatus and methodology can accommodate various wire types, is independent of twist rates, is adaptive to different cable types and lengths, and is not distance dependent. Each of these are substantial advantages over the prior art.

The preferred product can send the tones from the CIP to the AUP (where the compensation software and tables are loaded) in about 100 milliseconds, which will typically be transparent to a user if the user is the only user attached to the respective computer through the matrix switch AMS. If, however, the time is objectionably long (for example, resulting in flicker, etc.) or if a second user is simultaneously connecting to the computer (which may result in a flicker on the second user's monitor), the tones can be sent during several consecutive blanking intervals, for example during six consecutive blanking periods. In the latter case, during each of the six blanking periods, one of the six tones can be sent down the CAT5 cable to provide the tone test.

When a user selects a server from the OSD in the AUP 31–35, a routing protocol then determines the appropriate KVM path to the selected server. This path is then opened by the AMS. A short time later a tone sequence request is sent to the CIP that is attached to the selected server. The CIP then sends a number of tones between 32.35 kHz and 48 MHz simultaneously on all three guns (R, G, B).

The corresponding received amplitude for each tone is processed by a Log Amp 55 whose resultant output is then digitized by a fast A/D converter 56. The use of a Log Amp results in a log slope of 24 mV for each dB of signal change. The ability to compress signals of wide dynamic range avoids the use of gain or range switching at the front end and improves overall measurement speed.

The values returned by the measurement system are a decibel representation of the frequency response of the link at discrete points.

The returned values are then compared with the reference cable mapping taken at 10 ft. intervals for the cable type. As previously described, that map resides within the AUP memory.

Associated with this reference cable mapping are the appropriate equalization control voltages that were determined empirically at 50 ft. intervals for the same reference CAT5 cable. In one example embodiment, control voltages for any 10 ft. segment between 50 ft. lengths are determined by piecewise linearization (i.e., it is assumed that the equalizer control voltages follow an approximate linear slope between any 50 ft. interval).

When a best fit is determined between the frequency response data of the selected link path and the generic cable mapping in memory, the appropriate correction voltages are applied to the equalizer stage.

The procedure is carried out for all three colors on three CAT5 twisted pairs.

It is also assumed (to a first approximation) that all CAT5 style cables of interest for KVM purposes have the same general attenuation curve to the generic one stored in memory. Of course, the target cable need not emulate the laboratory cable at common distances, which is an advantage of the present embodiment. That is, it is enough to know that a length of high quality low loss CAT5 behaves like a shorter length of poorer quality cable with a higher loss. In the end, regardless of length, the appropriate compensation should be applied.

If this assumption is not sufficiently accurate then the cable equalization system allows for multiple cable mappings to be stored in memory to accommodate different and more exotic cable types.

The total time required for the cable equalization routine is approximately 110 mS, which is essentially undetectable to the user. The inherent high speed of this approach guarantees minimum disturbance to a second user that is connected to the same server (and therefore CIP) from another node in the matrix system.

In an alternative embodiment, the system lends itself to the formulation of a mathematical relationship between the measured frequency response data and the applied correction voltages to the equalizer stage. This would eliminate any requirement for cable mappings and/or look-up tables.

In another alternative embodiment, video disturbance to all users is eliminated by sending the equalization tones sequentially during the vertical or frame blanking interval (approximately 500 uS).

As an added benefit there is no requirement to store link equalization parameters as cable equalization is performed each time a switch is made thereby reducing storage requirements for system maps, etc.

Because all cable pairs that carry color information are characterized and equalized separately, there is no requirement for a specific cable pair pinning assignment. With the appropriate software, deteriorating link conditions due to poor cable interconnects, damaged cable etc. can be detected in advance of a catastrophic failure. This information can then be used to alert a system administrator so that preventative action can be taken.

Automatic Adaptive Cable Equalization.

In the example system, one sees that frequency dependent attenuation is automatically corrected up to 1,000 feet of CAT5 style cable each time a valid KVM path is selected. To do so, the system includes:

(1) An adaptive equalizing filter to synthesize an inverse cable loss curve. The equalizer is based on the summation of an all-pass function with a n umber of weighted high pass sections. The weighting is implemented using voltage-controlled amplifiers following each of the high pass sections;

(2) A tone generation block within the Transmitter (i.e. CIP);

(3) A measurement stage consisting of a source select switch (for each gun), a Log Amp and an A/D Converter; and (4) A software routine to interpret the measured data and apply the appropriate correction values.

FIG. 2 illustrates an example equalizer circuit employing the compensation control voltages. FIG. 2 illustrates the red "gun," but similar guns exist for the blue and green components as well. The red component is received on the cable into DC pass through filter 50, the output of which is provided to the summer 54. Also provided to the summer are the outputs of a low band filter 51, medium band filter 52, and high band filter 53. The circuitry of FIG. 2 is a known type of circuitry, which is adapted for use with the novel control voltages employed by the present embodiment. In essence, the three filters 51–53, provide weighted outputs in order to compensate for video distortion on the cable. The amount of compensation is determined by the amount of control voltage applied to each of the filters 51–53.

Figure 3:
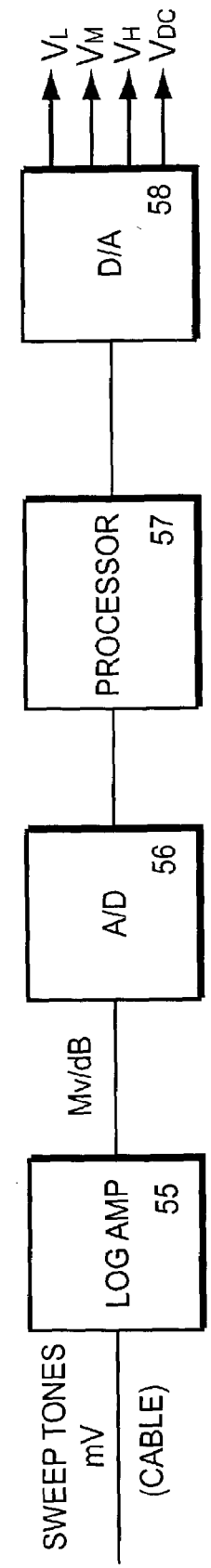
FIG. 3 is a schematic representation of example cable measurement circuits.

FIG. 3 illustrates how the control voltages are obtained. On the same cable, as previously described, tones are applied to the cable, the output of which (i.e., the response of the cable to the tones) are applied to the log amplifier 55. Ultimately, an array of measured tone values are taken and compared to the reference value tables stored in processor 57 in order to find a close matching band. This close matching band is a section of the array that roughly matches the measured values provided into Log Amp 55. The output of the Log Amp 55 is provided to A to D converter 56, the output of which is provided the processor 57 for the comparison. The processor performs the matching function according to a particular selected match routine and outputs the control voltages to the D to A converter 58 which produces the $V_L$, $V_M$, $V_H$, and $V_{DC}$ voltages that control the equalizer of FIG. 2.

One purely example way to match the measured values with the mapped values is to choose a mid band frequency to determine the center point of the rough fit table. This rough fit table is determined by scanning the full reference table against the measured value. A delta value is calculated as the scan goes across the reference table. The point where the delta value changes polarity is used as the center point for the rough fit table. Using this rough fit approach saves processor search time in determining the more accurate value. The localized band is then used as a reference table to zero in on the close match for the measured values.

The zeroing in function occurs as follows. From the rough local table, it is possible to scan a smaller table more thoroughly. Using the full range of measured values as a seed (i.e., the measured values for each of the tones used) a scan is performed on the rough table. The focus of this scan is to determine the best match with the reference values. In one example, in determining the best fit value, the routine places more weight on matches with lower frequency tones than it does on the higher frequency values. The reason behind this is that the most objectionable video effects are caused by the result of lower frequency deterioration (i.e., long streaks or trails of color).

It is possible to apply other "weighting" depending on the overall desired effect, and the above example is not limiting of the present invention.

From the scan, a close match value is selected based on one or more of the following criteria:

(1) The array value with the most matches across the frequency bands;

(2) In the case of multiple matches, the array value that has the best low frequency match; and (3) In the case of multiple matches, the first matched value.

Of course, the artisan can consider many other different types of schemes for determining a match condition between the measured tone values and the reference value array, and the above example is not intended to limit the present invention.

The resultant match value is output by the processor 57 to the D to A converter 58 and is then used to set the correction values in the equalizer circuit of FIG. 2. This routine is performed for each of the color guns, thus giving a close fit for each of the twisted pairs carrying video.

If a cable type has special electrical characteristics, a reference mapping may be done for that specific cable, which can then be incorporated into the processor code 57. Using this approach allows a fully flexible method of determining the most accurate and appropriate correction voltage that needs to be applied to a particular length or type of cable, without knowing the length of the particular cables used and without imposing inordinate delays on the active compensation system.

Figure 9:
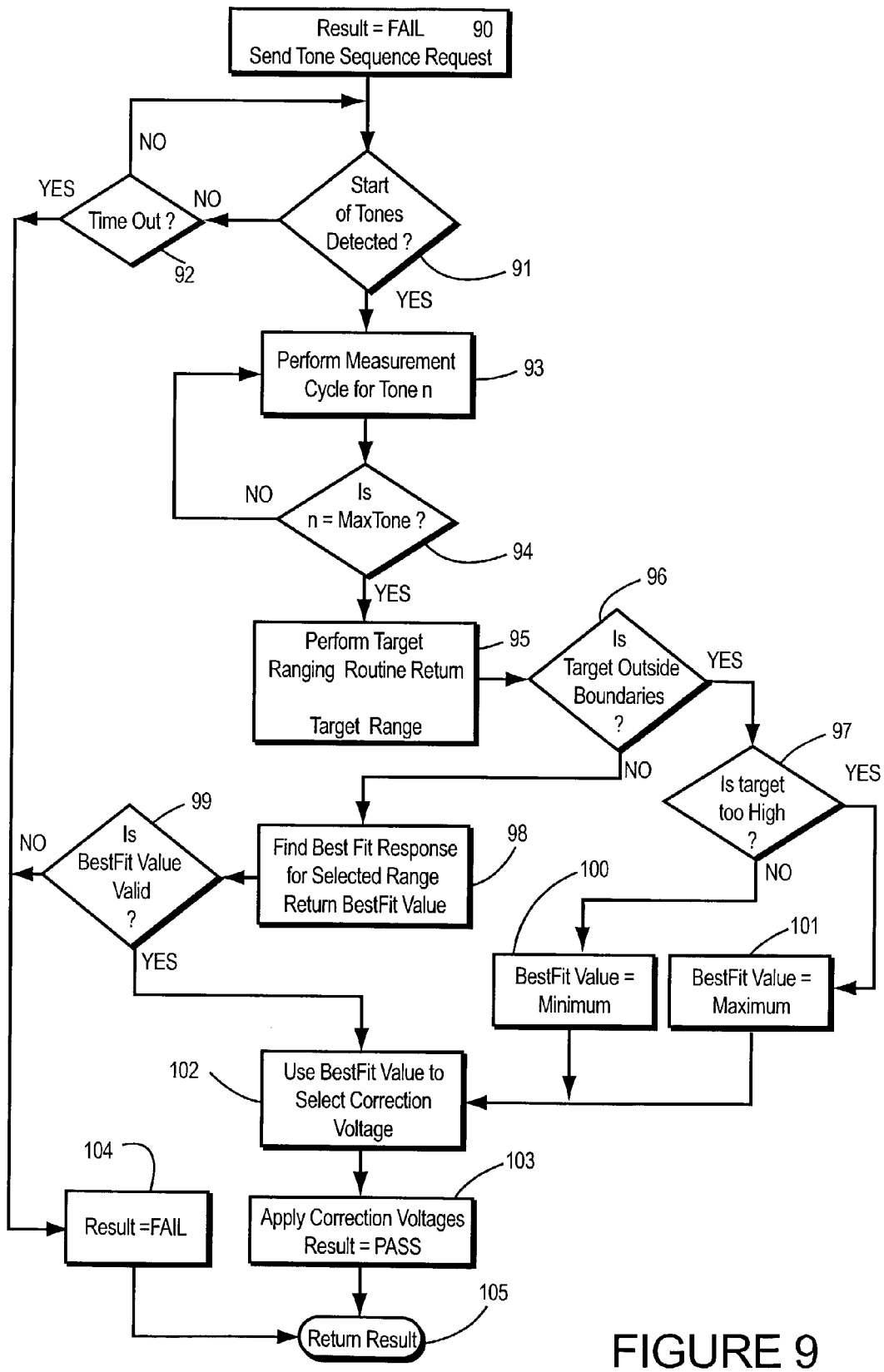
FIG. 9 is an example flow chart of an equalization system.

The method is further described with respect to FIG. 9. In FIG. 9, the request for tone sequences is sent from the AUP to the CIP in step 90. In response, the CIP sends the tones down the cable back to the AUP. If the tones are detected in step 91, the AUP performs measurement cycles for tone N at step 93. The measurements continue at step 93 until the maximum number of tones is accomplished at step 94 whereupon the AUP determines whether the measured responses are within a window range provided by the stored map. If the measured tones are outside the boundaries at step 96, and the target is too high at step 97, the best fit is set as the maximum compensation at step 101.

If the target is outside the boundaries at step 96 and the target is not too high at step 97, the best fit value is equated to the minimum compensation at step 100. If on the other hand the measured targets are inside the window boundaries at step 96, the best fit response is determined by comparing the measured response with the table response, as previously described, at step 98.

If the best fit value from step 98 is not valid, the result fails and the method returns to step 90, at step 104. If, the best fit value is valid at step 99, the best fit value is used to select the correction voltage at step 102 via processor 57 of FIG. 3. The correction voltages are then applied at step 103 to the filters 51–53 of FIG. 2. Thereafter, the process ends at 105.

If after the tone request is provided by the AUP at step 90 and no tones are detected at step 91 after a time out condition at step 92, the process fails step 104 and returns to the tone request at step 90.

Automatic Adaptive Cable De-Skew Compensation

In another embodiment, delay skew on the cable is adaptively compensated. Different CAT5 cables have different twist rates to minimize radiation between the pairs. As a result, at the end of a relatively long CAT5 cable, the color component information will arrive at different times for the respective components, yielding spatial separation on a CRT.

In the preferred embodiment one determines the slowest pair of the CAT5 cable and slows up the other two in order to repair the time coincidence. This is accomplished by the AUP requesting a tone (that could be the same tone used for equalization previously described above), for example 750 kilohertz. The tone is sent on all three color component pairs. Before measurement, a pair select function provides various pair selections such as, in the first instance, a comparison of the green component versus the red component. (Note that any rounding of rise times that will inevitably occur as the video travels down the CAT5 can be re-squared at the receiving end and will not effect the phase compensation assuming that both color components are rounded by a similar amount). Next, a phase comparator gets the output voltage, compared with a predetermined delay, and records a lead or lag together with a value stored for that given pair (green versus red). Next, blue versus red is selected and the process repeated to get a voltage valuation (and lead/lag) of delay for this color comparison. Next, blue versus green is compared, followed by red versus green (exactly the opposite of the first comparison (green versus red) to allow a cancellation of any dc offset of phase compensation circuit due to, for example, flip flops that may not be perfectly matched, etc.).

With the above information, the system can determine the relative time delays per pair. Using that information, the delays can be switched into the components themselves.

In the prior art, delays are provided by lump delays (lc networks) which is not very effective. In order to minimize ripples in such lump delays, there must be lots of stages, requiring lots of components and lots of space. In this embodiment, printed inductors are placed spirally on pc boards and capacitors (discrete) added to reach a normalized impedance. Alternatively, the parasitic capacitance of the bilateral CMOS switches used in the switching can be used for the capacitance in the lc networks, to eliminate or supplement the discrete capacitors.

Thus, the system can automatically detect and correct for inter-pair delay skew that is inherent in CAT5 style cables. In the example embodiment, the system is set up with a maximum compensation range of 128 nS with a 1 nS set-point resolution.

Figure 7:
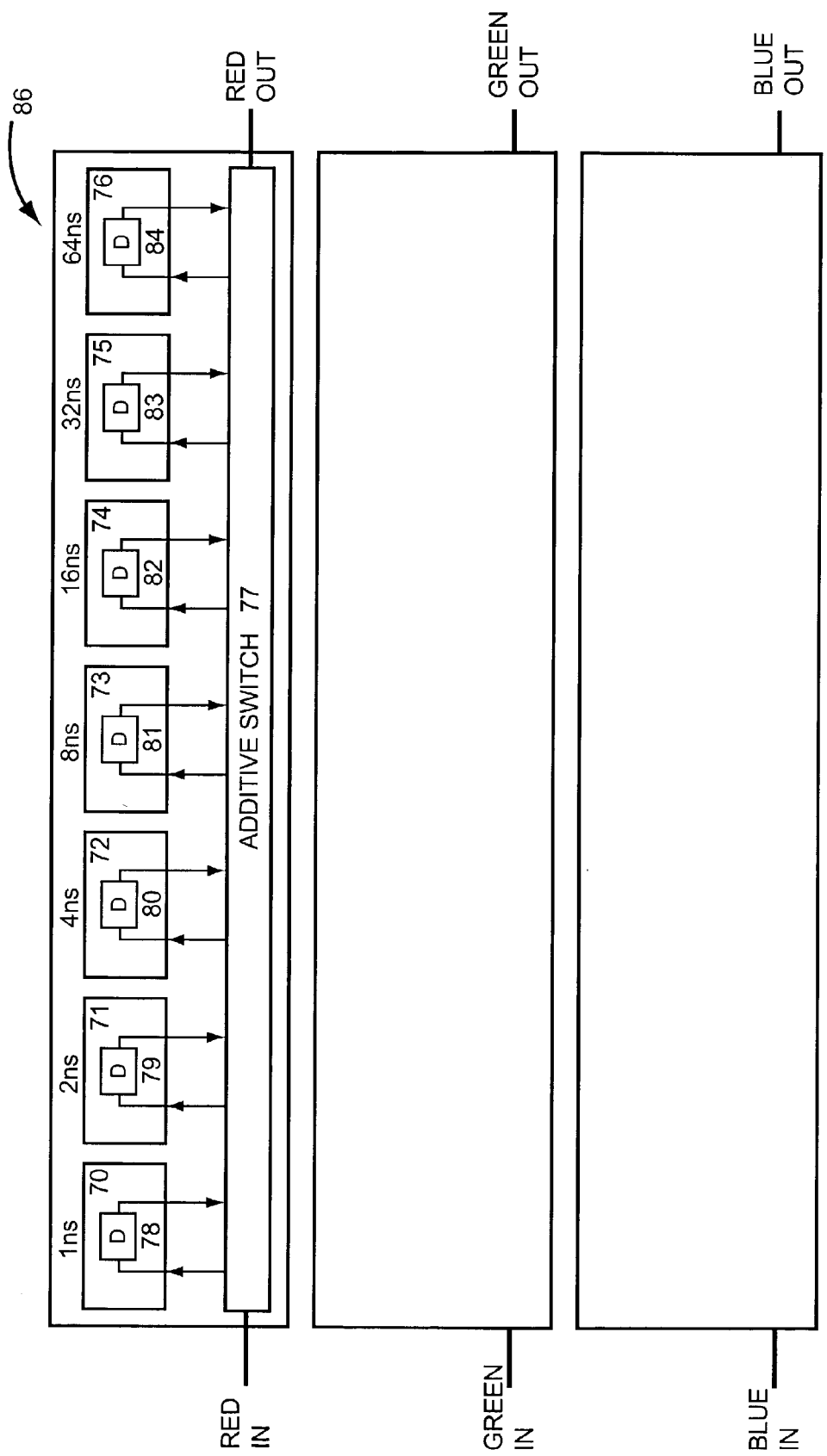
FIG. 7 is an example actively controlled delay line circuit.
Figure 8:
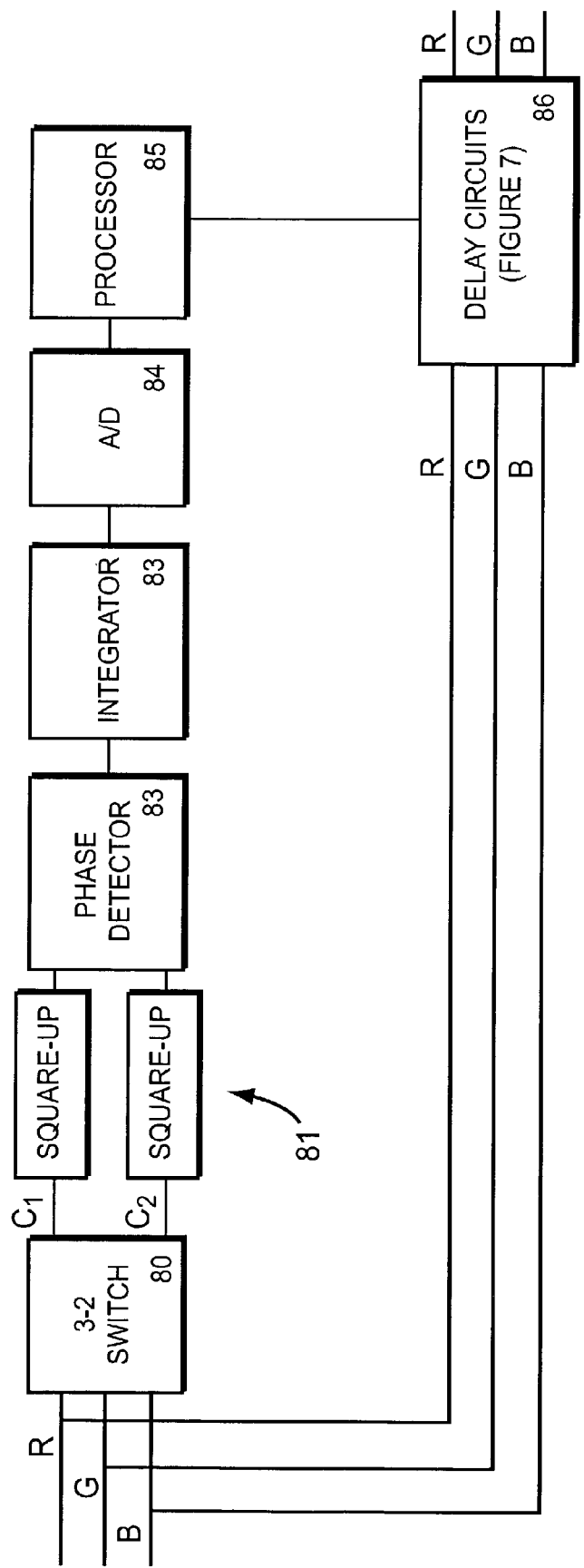
FIG. 8 is an example embodiment of de-skew compensation circuitry.

The de-skew process includes:

(1) A tone generator block within the Transmitter (i.e., CIP). This can be the same one used for the cable equalization;

(2) A binary weighted analog delay block for each video path such as is shown in FIG. 7;

(3) A measurement stage (such as shown in FIG. 8) consisting of a source select switch for comparing CAT5 signal pairs, a signal conditioning stage using comparators, a charge pump digital phase detector and an A/D converter; and (4) A software routine to interpret the measured data and insert the appropriate compensating delay values.

In operation, after the user selects a server from the OSD in the AUP, and a routing protocol opens an appropriate KVM path to the selected server, a tone sequence request is sent to the CIP that is attached to the selected server. The CIP then sends a number of tones between 32.25 KHz and 48 MHz. for cable equalization purposes, as described before. When de-skew is required, an additional 750 kHz tone is sent after the main equalizer tone string. This tone is available on all three color pairs simultaneously.

In the AUP the source select switch 80 (in the measurement stage) isolates two of the video paths for connection to the measurement circuitry. High speed comparators 81 "square up" the received tone's edges (the relative edge to edge timing i.e., delay skew which is what is of interest remains unchanged) before the digital phase detector 82.

The digital phase detector 82 is edge triggered with a charge pump at its output. This is followed by an active integrator 83 resulting in a linear output voltage for each nS of delay skew at its input. The conversion gain is approximately 20 mV/nS. Output polarity indicates lead or lag conditions.

The integrators output is digitized by the second channel of the A/D converter 84 and stored by processor 85. This process is repeated for all other video path combinations, i.e. Green relative to Red, Blue relative to Red and Blue relative to Green.

An additional combination of Red relative to Green is used in conjunction with the Green relative to Red above to determine the magnitude of any residual DC offsets within the measurement system. These offsets can then be nulled by the software.

Once the relative Delay Skews between each of the video paths have been determined, the processor 85 then controls the delay circuits 86 (via switch 77 in FIG. 7) to insert an appropriate delay in to each of the two quicker paths such that their propagation delay now equals that of the slowest path. In FIG. 7, the switch 77 is additive in sense that it can put one, two, three, four, five, six, all seven, or any combination thereof of the delay elements 70–776. Because delay elements 70–76 are binary, the switch can "add" into the color component (red in the upper portion of FIG. 7) any amount or delay from 1 ns to 128 ns band on the number and delay value of the delays 70–76 added in.

Again because all cable pairs that are carrying color information are characterized and skew compensated for separately there is no requirement for a specific cable pair pinning assignment.

A number of design approaches were considered in developing the delay elements used in the De-Skew circuitry. Stripline elements were originally considered in order to preserve bandwidth but were less worthwhile as the length of copper trace (approximately 66 ft.) required to implement 128 nS resulted in un-acceptable losses.

Commercial lumped delay elements were also considered but were also less worthwhile as they had an insufficient number of internal delay sections for a given delay to ensure minimum amplitude ripple and pulse distortion, and their cost was prohibitive.

The preferred solution consists of discrete LC delay sections where the inductor is implemented as a two turn printed coil in a multi-layer PCB and the capacitor is a discrete surface mount component component, where $$Td=\sqrt{(L \times C)} \text{ and } Zo=\sqrt{(L/C)}$$

Two LC sections per nanosecond of delay are used where L=7.4 nS, C=33 pF and Zo=15R.

The 128 nS assembly consists of 1 nS, 2 nS, 4 nS, 8 nS, 16 nS, 32 nS and 64 nS delay sections 70-76 resulting in a binary weighted digitally controlled solution.

The switch element for each delay section consists of two SPDT bi-lateral CMOS switches.

An alternative and a novel feature of one design is that the significant parasitic capacitance associated with the source terminal of the CMOS switch becomes an integral part of the required delay line capacitance at each end of a binary weighted delay section, i.e., it is effectively "turned out." This allows the use of low cost CMOS switch elements and yet ensures optimum rise time performance.

In order to reduce manufacturing costs further it is possible to implement the delay line capacitors as printed components i.e., both the inductors and capacitors are not printed structures in the PCB copper layers.

Method of Reducing Datalink Pair Crosstalk in CAT5 RJ45 Connector

The following describes a third method of compensation that can be used independently or in combination with one or both of the prior compensation methods.

In bi-directional data links, at extended distances (like 1,000 feet and beyond) a high level of video equalization is required. Fifty point-to-point right beside the video pairs would not be unusual in such a case, inducing single ended noise. This embodiment provides deliberate balancing of the noise in the pair by the imposition of neutralizing capacitors. This gives some amount of noise on the pairs which will then be rejected by the noise rejection circuitry. The result is a removal of graininess over long distance communication.

The physical connection between any Tx and Rx element within the system is a 100 Ohm, 4-pair Basic Category 5 (CAT5), Enhanced Category (CAT5e) or Category 6 (CAT6) LTP/FTP cable as specified in TIA/EIA-568-A or proposed by TIA (CAT5e, CAT6); Class D or Class E as specified in ISO/IEC 11801 and the interconnect is a media interface connector specified in IEC 60603-7 (commonly referred as RJ45) with pin connections according to EIA T568B.

Wire pairings are as follows:

| PIN NUMBER | SIGNAL | WIRE COLORS |
| --- | --- | --- |
| 1 | Green – | Orange/White |
| 2 | Green + | Orange |
| 3 | Blue – | Green/White |
| 4 | Red + | Blue |
| 5 | Red – | Blue/White |
| 6 | Blue + | Green |
| 7 | Data – | Brown/White |
| 8 | Data + | Brown |

The data pair used in this embodiment is a bi-directional EIA 485 compliant interface. As a result of the requirement to be compliant with EIA/TIA-568, edge energy from Data– (Pin 7) is capacitively coupled to Blue+(Pin 6) and to Blue–(Pin 3) within the RJ45 housing. As Pin 6 is much closer to Pin 7 than Pin 3 the inter-electrode capacitance between Pin 6 and Pin 7 is therefore greater than the inter-electrode capacitance between Pin 6 and Pin 3.

Thus more Data rate edge energy is coupled to Pin 7 than to Pin 3. This results in a significant differential noise signal at the input of the differential Receiver for the Blue gun and appears at its output along with the wanted Blue gun signal.

At extended distances this blue signal is subjected to significant high frequency amplification in order to compensate for high frequency loss in the cable. The induced data rate noise is also amplified. This results in "patterning" superimposed on the wanted image.

This effect can be minimized if the induced data rate noise on Pin 3 is equal in magnitude to the induced data rate noise on Pin 6. This common mode signal is then rejected by the CMRR of the differential receiver at the front end.

This can be easily achieved by connecting a small value "neutralizing" capacitor between Pin 7 and Pin 3.

The capacitor selected is such that the inter-electrode capacitance between Pin 3 and Pin 7 is now equal to the inter-electrode capacitance between Pin 6 and Pin 7.

Similarly, a second capacitor between Pin 4 and Pin 7 can be used to minimize data rate noise on the output of the differential receiver for the Red gun.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An analog video switch, comprising:
    a switch to establish different conductive paths between a set of workstations receiving analog video signals and a set of servers sending analog video signals;
    a memory device to store a predetermined table of response characteristics of a specified conductor path type when said conductor path type receives a set of predetermined frequency tones;
    a testing circuit in communication with the different conductive paths to record a measured response of said conductive paths to said set of predetermined frequency tones;
    an equalizer circuit to apply compensation signals to components of said analog video signals in relation to said measured response of said conductive paths to said set of predetermined frequency tones.

2. A switch as in claim 1, wherein the set of predetermined frequency tones are selected between the values of 325 KHz and 48 MHz.

3. A switch as in claim 1, further including a plurality of testing circuits and equalizers, one each per component of said analog video signals.

4. A switch as in claim 1, wherein the testing circuit includes at least one computer interface pod and at least one user pod.

5. A switch as in claim 4, wherein the computer interface pod includes circuitry to receive a tone request from the user pod and respond by applying the set of predetermined frequency tones to the conductive paths.

6. A switch as in claim 5, wherein the user pod issues the tone request and determines said measured response.

7. A switch as in claim 1, wherein the equalizer includes a set of low, middle and high filters independently controlled by said compensation signals.

8. A method of compensating an analog video component transmitted over an undetermined cable length, comprising:
    pre-storing a predetermined table of response characteristics of a specified conductor path type for a number of incremental conductor path lengths, when said conductor path type of said path lengths receive a set of predetermined frequency tones;
    pre-storing a set of predetermined compensation values for each of said response characteristics for each of said conductor path lengths;
    testing said undetermined cable length of said conductor path type to record a measured response of said cable length to said set of predetermined frequency tones;
    comparing said measured with said pre-stored table to identify a close match between said measured response values and said pre-stored tab le values;
    identifying a corresponding ones of said predetermined compensation values;
    applying said corresponding ones of said predetermined compensation values to an equalizer to compensate said analog video component.

9. A method as in claim 8, wherein the set of predetermined frequency tones are selected between the values of 325 KHz and 48 MHz.

10. A method as in claim 8, further including receiving a tone request and responding by applying the set of predetermined frequency tones to said cable length.

11. A method as in claim 8, further including applying the corresponding ones of compensation values to said equalizer as low, middle, and high compensation values.

12. A method as in claim 11, further including applying the corresponding ones of compensation values to said equalizer as a dc passthrough value.

* * * * *